United States Patent
Bai et al.

(10) Patent No.: US 7,542,685 B2
(45) Date of Patent: Jun. 2, 2009

(54) SYSTEM AND METHOD FOR AUTOMATIC CHROMATIC DISPERSION COMPENSATION

(75) Inventors: Yu Sheng Bai, Los Altos Hills, CA (US); Rong Zhang, Cupertino, CA (US)

(73) Assignee: FutureWei Technologies, Inc., Plano, TX (US)

(*) Notice: Subject to any disclaimer, the term of this patent is extended or adjusted under 35 U.S.C. 154(b) by 475 days.

(21) Appl. No.: 10/845,203

(22) Filed: May 12, 2004

(65) Prior Publication Data

US 2005/0254825 A1 Nov. 17, 2005

(51) Int. Cl.
*H04B 10/04* (2006.01)
(52) U.S. Cl. .............. 398/193; 398/147; 398/158; 398/159; 398/162; 398/192; 398/195; 398/198; 398/199
(58) Field of Classification Search .............. 398/5, 398/34, 81–201; 359/110–161; 385/37
See application file for complete search history.

(56) References Cited

U.S. PATENT DOCUMENTS

| | | | | |
|---|---|---|---|---|
| 5,608,562 A * | 3/1997 | Delavaux et al. | ............ | 398/148 |
| 5,995,256 A * | 11/1999 | Fee | ............. | 398/34 |
| 6,356,684 B1 | 3/2002 | Patterson et al. | | |
| 6,370,300 B1 * | 4/2002 | Eggleton et al. | ............. | 385/37 |
| 6,456,411 B1 * | 9/2002 | Ishikawa et al. | ........... | 398/192 |
| 6,519,390 B2 | 2/2003 | Fells et al. | | |
| 6,654,564 B1 | 11/2003 | Colbourne et al. | | |
| 6,889,011 B1 * | 5/2005 | Fee et al. | .................... | 398/148 |
| 2002/0036812 A1 * | 3/2002 | Bai | ............ | 359/124 |
| 2002/0063934 A1 * | 5/2002 | Sakauchi | .................... | 359/173 |
| 2002/0089724 A1 * | 7/2002 | Nishimoto et al. | ......... | 359/161 |
| 2003/0025957 A1 * | 2/2003 | Jayakumar | ................ | 359/110 |

(Continued)

FOREIGN PATENT DOCUMENTS

WO  WO 00/76102  12/2000

(Continued)

OTHER PUBLICATIONS

Kuwahara et al: "Automatic Chromatic Dispersion Compensation Using Alternating Chirp Signal for Installation of High-Speed Transmission Systems", Journal of Lightwave Technology, vol. 20, No. 12, Dec. 2002, pp. 2044-2051.*

(Continued)

*Primary Examiner*—Kenneth N Vanderpuye
*Assistant Examiner*—Li Liu
(74) *Attorney, Agent, or Firm*—Townsend and Townsend and Crew LLP

(57) ABSTRACT

An apparatus and method for transmitting a signal for optical network applications with automatic chromatic dispersion compensation. The apparatus includes a first optical transmitter. The first optical transmitter includes a first light source configured to generate a first laser signal in response to a first laser drive signal, a first data modulator configured to receive the first laser signal and a first data drive signal and output a first chirped return-to-zero signal, and a first signal source configured to generate a first non-return-to-zero signal. Additionally, the apparatus includes a first clock and data recovery system, a first data driver, a first adjustment system, and a first control system.

27 Claims, 13 Drawing Sheets

U.S. PATENT DOCUMENTS

2004/0208521 A1* 10/2004 Kaneko .................. 398/30
2004/0213578 A1* 10/2004 Takahara et al. ............ 398/147

FOREIGN PATENT DOCUMENTS

WO     WO 01/27940     4/2001

OTHER PUBLICATIONS

Kuwahara et al:"WDM field demonstration of path provisioning by automatic dispersion compensation using tone modulated CS-RZ signal", Electronics Letters, vol. 39, No. 22, Oct. 2003.*

Bülow et al., Electronic PMD Mitigation—from Linear Equalization to Maximum-Likelihood Detection, Optical Society of America (2000), 3 pages total.

* cited by examiner

SYSTEM AND METHOD FOR AUTOMATIC CHROMATIC DISPERSION COMPENSATION

CROSS-REFERENCES TO RELATED APPLICATIONS

This application is related to U.S. patent application Ser. No. 09/802,222 filed Mar. 8, 2001 and U.S. patent application Ser. No. 09/642,033 filed Aug. 18, 2000, both of which are incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for automatic chromatic dispersion compensation. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

In optical communications, an optical signal may transmit a long distance, such as hundreds or even thousands of kilometers, in single mode optical fiber links. An important property of optical fibers is chromatic dispersion, that is different spectral components of the signal travel at different speed in the optical fibers. The chromatic dispersion may broaden the signal pulses and limit the transmission distance. For example, a single mode fiber (SMF) has a chromatic dispersion of 17 ps/(nm×km) at a signal wavelength of 1550 nm. If the spectral width of the signal is 0.1 nm, the signal pulses would become 170 ps wider after a transmission distance of 100 km. For high-speed transmissions at over one gigabit per second, the bit periods are only a few hundred picoseconds, or even a few tens picoseconds; thus such broadening can significantly degrade the detectability of the signal.

The pulse broadening is related both to the spectral width of the optical signal and dispersion of the optical fiber. To improve the dispersion-limited transmission distance, it is desirable to narrow the spectral width of the optical signal. Some transmitters use directly modulated semiconductor diode lasers (DMLs) to generate an optical signal. DMLs usually introduce additional frequency modulations to the optical signal, such as a chirp on top of the intensity modulated signal, and broaden the signal spectrum. The broadening of the signal spectrum may in turn reduce the dispersion-limited transmission distance. In contrast, other transmitters use continuous wave (CW) semiconductor diode lasers and low-chirp external modulators, which introduce less spectral broadening.

The spectral width of a chirp-free optical signal is given by the Fourier transform limit. The spectral width is about equal to the inverse of the minimum pulse duration, or equal to the data rate. For example, a non-return-to-zero (NRZ) binary signal has a data rate of 10 Gbps and the minimum pulse duration of 100 ps. The spectral width is about 10 GHz or 0.08 nm. If the signal transmits 70 km in a single mode fiber (SMF) with a cumulative dispersion of 1200 ps/nm, the signal pulses would be broadened by about 100 ps. This broadening is approximately equal to the bit period. Thus the dispersion-limited transmission distance of a chirp-free 10-Gbp NRZ optical signal is about 70 km in SMF.

To transmit beyond the dispersion-limited transmission distance, the dispersion compensation is usually required. A conventional method for compensating chromatic dispersion in optical fibers uses dispersion compensating fiber (DCF), which exhibits a negative chromatic dispersion. For example, segments of DCF are inserted in transmission lines between individual fiber spans at nodes where other transmission procedures are performed. These transmission procedures may include optical amplification and optical channel add/drop. The negative dispersion value of DCF at each node is selected so that the cumulative total dispersion at the node is close to zero. Additionally, at the end of the transmission, just before the receiver, the cumulative dispersion should be at an optimal value where the distortion of the signal is minimal. For example, at the limit of linear transmission of a chirp-free signal, this optimal value is equal to zero. When other factors are accounted for, the optimal value may shift away from zero.

Due to variations in fiber routes, the actual cumulative dispersion for any given compensated transmission line can vary by a large amount. Deviations from the optimal value of cumulative dispersion may cause penalties to the receiver performance. The tolerance of a transmission system to such deviations is called dispersion compensation tolerance, or dispersion tolerance. The optimal value for the cumulative dispersion is referred to as the center of the dispersion tolerance window.

Many factors may cause deviations from the optimal cumulative dispersion. Among them are the length of a fiber span, the dispersion of a transmission fiber, and the dispersion of a dispersion compensating fiber. For example, unforeseen fiber cuts and repairs may change the value of the cumulative dispersion. A change of 20 km in the length of a single mode fiber may shift the cumulative dispersion by 340 ps/nm. Additionally, the fiber dispersion is affected by temperature and aging.

In dense wavelength division multiplexing (DWDM) transmissions, the chromatic dispersion and its compensation is complicated. Fiber dispersion is usually wavelength dependent, and the dispersion slope is usually about 0.05-0.09 ps/(nm²×km). For DWDM transmissions, dispersion compensating fibers (DCFs) should usually have negative dispersion slopes. Variations in dispersion slopes are often limited to 10%, which means the dispersion slopes in transmission lines can only be compensated up to 90%. For a transmission line of 1000 km, the cumulative dispersion variation across a DWDM transmission window, such as from 1530 nm to 1562 nm in C-band, could vary by $$0.09 \text{ ps/}(nm^2 \times km) \times 32 \text{ nm} \times 1000 \text{ km} \times 10\% = 288 \text{ ps/nm} \quad \text{(Equation 1)}$$

In other example, certain low-cost DCFs can provide only 60% slope compensation; hence the cumulative dispersion variation increases to 1152 ps/nm.

In order to improve dispersion compensation, adjustable optical dispersion compensators have been proposed. For example, an adjustable optical dispersion compensator is similar to a disperse compensation fiber with a varying length. The length variation can either continuously or in steps adjusts the value of cumulative dispersion. When used, the value of cumulative dispersion can be adjusted to minimize the distortion on the received signals. If an adjustable optical dispersion compensator has a sufficient range, the compensator can be adjusted to obtain a total cumulative dispersion to optimize the receiver performance. The range of the adjustable dispersion varies with the underlying mechanism of the dispersion compensator. Usually, adjustable optical dispersion compensators with large adjustment ranges are bulky and costly.

As another example, electronic dispersion compensators can provide adjustable dispersion compensation. For example, an electronic dispersion compensator restores, after the optical-to-electrical conversion, the received signal distorted by the dispersion. After the signal restoration, the dispersion tolerance window becomes wider, but the center of the dispersion tolerance window remains the same. Since the dispersion occurs in the optical domain but the compensation is performed in the electronic domain, the compensation is usually very limited. For example, electronic dispersion compensators can increase the width of the dispersion tolerance window by about 50%.

Hence it is highly desirable to improve techniques for compensating chromatic dispersion in optical networks.

BRIEF SUMMARY OF THE INVENTION

The present invention relates in general to telecommunication techniques. More particularly, the invention provides a method and system for automatic chromatic dispersion compensation. Merely by way of example, the invention is described as it applies to optical networks, but it should be recognized that the invention has a broader range of applicability.

According to one embodiment of the present invention, an apparatus for transmitting a signal for optical network applications includes a first optical transmitter. The first optical transmitter includes a first light source configured to generate a first laser signal in response to a first laser drive signal, a first data modulator configured to receive the first laser signal and a first data drive signal and output a first chirped return-to-zero signal, and a first signal source configured to generate a first non-return-to-zero signal. Additionally, the apparatus includes a first clock and data recovery system configured to receive the first non-return-to-zero signal and generate the first laser drive signal and a first data control signal, a first data driver configured to receive the first data control signal and generate the first data drive signal, a first adjustment system configured to receive a first laser control signal and the first laser drive signal and adjusts the first laser drive signal in response to the first laser control signal, and a first control system configured to receive a first input signal and output the first laser control signal in response to the first input signal.

According to another embodiment of the present invention, a system for transmitting a signal for optical network applications includes a first optical transmitter configured to output a first chirped return-to-zero signal associated with a first frequency chirp, a second optical transmitter configured to output a second chirped return-to-zero signal associated with a second frequency chirp, and a multiplexing system configured to receive at least the first chirped return-to-zero signal and the second chirped return-to-zero signal and generate a multiplexed optical signal. Additionally, the system includes an optical transmission system configured to receive the multiplexed optical signal, and a demultiplexing system coupled to the optical transmission system and configured to generate at least a first optical signal and a second optical signal. The first optical signal is associated with the first chirped return-to-zero signal, and the second optical signal is associated with the second chirped return-to-zero signal. Moreover, the system includes a first optical receiver configured to receive the first optical signal, and a second optical receiver configured to receive the second optical signal. The first optical receiver is further configured to generate a first feedback signal associated with a first characteristic related to the first optical signal, and the first optical transmitter is further configured to receive the first feedback signal, process information associated with the first feedback signal, and adjust the first frequency chirp based on at least information associated with the first feedback signal.

According to yet another embodiment of the present invention, a method for transmitting a signal for optical network applications includes receiving a first input signal, outputting a first laser control signal in response to the first input signal, generating a first non-return-to-zero signal, receiving the first non-return-to-zero signal, and generating a first laser drive signal and a first data control signal in response to the first non-return-to-zero signal. Additionally, the method includes receiving the first laser driver signal and the first laser control signal, adjusting the first laser drive signal in response to the first laser control signal, receiving the first laser drive signal, and generating a first laser signal in response to the first laser drive signal. Moreover, the method includes receiving the first data control signal, generating a first data drive signal in response to the first data control signal, receiving the first laser signal and the first data drive signal, and generating a first chirped return-to-zero signal in response to the first laser signal and the first data drive signal.

According to yet another embodiment of the present invention, a method for transmitting a signal for optical network applications includes outputting a first chirped return-to-zero signal associated with a first frequency chirp, outputting a second chirped return-to-zero signal associated with a second frequency chirp, receiving at least the first chirped return-to-zero signal and the second chirped return-to-zero signal, and generating a multiplexed optical signal in response to at least the first chirped return-to-zero signal and the second chirped return-to-zero signal. Additionally, the method includes receiving the multiplexed optical signal, and generating at least a first optical signal and a second optical signal in response to the multiplexed optical signal. The first optical signal is associated with the first chirped return-to-zero signal, and the second optical signal is associated with the second chirped return-to-zero signal. Moreover, the method includes receiving the first optical signal, receiving the second optical signal, generating a first feedback signal associated with a first characteristic related to the first optical signal, receiving the first feedback signal, processing information associated with the first feedback signal, and adjusting the first frequency chirp based on at least information associated with the first feedback signal.

According to yet another embodiment of the present invention, a computer-readable medium including instructions for transmitting a signal for optical network applications is provided. The computer-readable medium includes one or more instructions for outputting a first chirped return-to-zero signal associated with a first frequency chirp, one or more instructions for outputting a second chirped return-to-zero signal associated with a second frequency chirp, one or more instructions for receiving at least the first chirped return-to-zero signal and the second chirped return-to-zero signal, and one or more instructions for generating a multiplexed optical signal in response to at least the first chirped return-to-zero signal and the second chirped return-to-zero signal. Additionally, the computer-readable medium includes one or more instructions for receiving the multiplexed optical signal, and one or more instructions for generating at least a first optical signal and a second optical signal in response to the multiplexed optical signal. The first optical signal is associated with the first chirped return-to-zero signal, and the second optical signal is associated with the second chirped return-to-zero signal. Moreover, the computer-readable medium includes one or more instructions for receiving the first optical signal, one or more instructions for receiving the second optical signal, one or more instructions for generating a first feedback signal associated with a first characteristic related to the first optical signal, one or more instructions for receiving the first feedback signal, one or more instructions for processing information associated with the first feedback signal, and one or more instructions for adjusting the first frequency chirp based on at least information associated with the first feedback signal.

Many benefits are achieved by way of the present invention over conventional techniques. Certain embodiments of the present invention provide a method and system for increasing the chromatic dispersion tolerance in extended long haul optical fiber transmission systems, or in other optical fiber transmission systems where the dispersion tolerance is significantly narrowed due to the fiber nonlinearities. Some embodiments of the present invention provide a method and system for generating optical signals that self-adapt to the residual chromatic dispersion in dispersion compensated optical fiber transmission links so that the signals experience minimal distortions at the receivers. Certain embodiments of the present invention adjust the magnitude of the chirp on a CRZ signal in response to the variations in cumulative dispersion in dispersion compensated fiber routes. The adjustment is realized by changing the driving current, the driving voltage, or the driving RF power to a directly modulated laser in a transmitter. Some embodiments of the present invention use a performance-monitoring device on the receiver side. The performance monitoring device generates an output signal that can be used as feedback to control the driving current, the driving voltage, or the driving RF power for a directly modulated laser in a transmitter and therefore optimize the performance of a transmission system. Certain embodiments of the present invention provide a capability of shifting the center of the dispersion tolerance window and hence increasing the system tolerance to variations in cumulative dispersion. Some embodiments of the present invention can lower costs and reduce sizes of adaptive dispersion compensation systems. Certain embodiments of the present invention can adjust the center of the dispersion tolerance window and hence a large dispersion compensation range.

Various additional objects, features and advantages of the present invention can be more fully appreciated with reference to the detailed description and accompanying drawings that follow.

DETAILED DESCRIPTION OF THE INVENTION

The present invention relates in general to telecommunication techniques. More particularly, the invention provides a method and system for automatic chromatic dispersion compensation. Merely by way of example, the invention is described as it applies to optical networks, but it should be recognized that the invention has a broader range of applicability.

The dispersion limit for a chirp-free 10-Gbps NRZ signal is usually about 1200 ps/nm without dispersion compensation fiber (DCF). With DCF, the total cumulative dispersion can be negative as well as positive. The dispersion tolerance range thus expands to ±1200 ps/nm, and the total dispersion tolerance becomes 2400 ps/nm.

Figure 1:
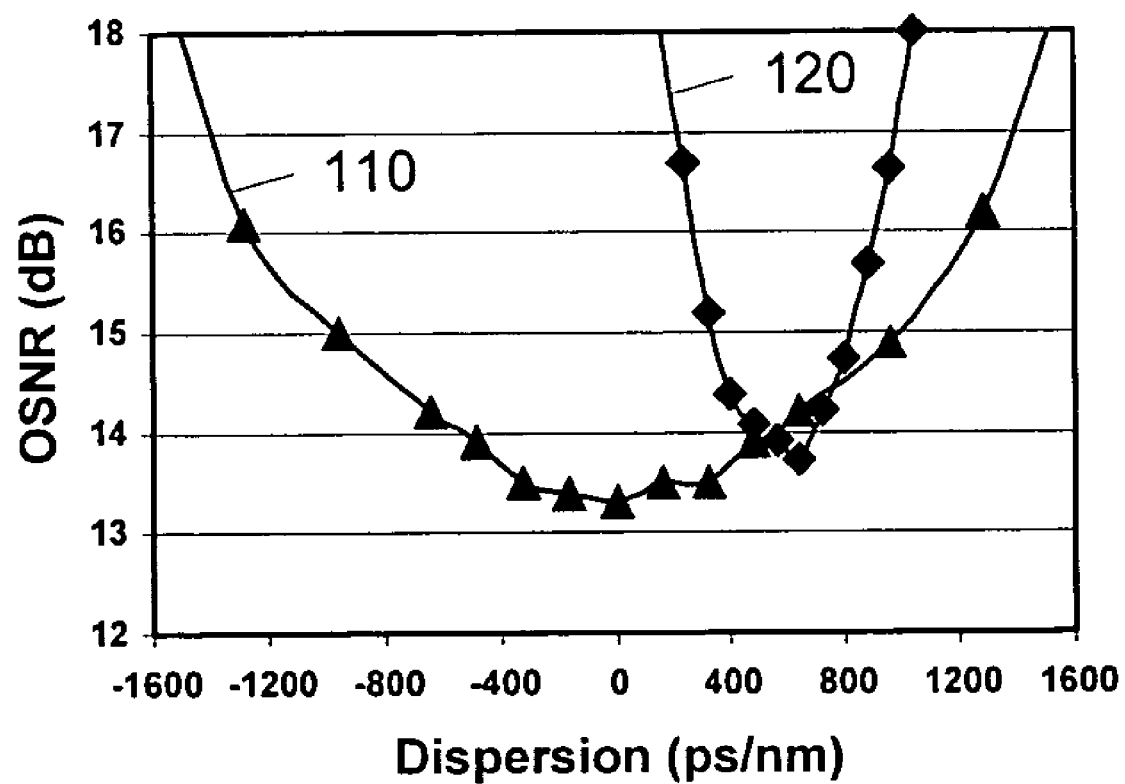
FIG. 1 is a simplified conventional dispersion tolerance for an NRZ signal.

FIG. 1 is a simplified conventional dispersion tolerance for an NRZ signal. This diagram is merely an example, which should not unduly limit the scope of the claims. One of ordinary skill in the art would recognize many variations, alternatives, and modifications. The NRZ signal may be externally modulated. The dispersion tolerance is measured by the minimum optical-signal-to-noise ratio (OSNR) required by a receiver for a fixed bit-error-ratio (BER) of $10^{-5}$ as a function of cumulative dispersion. As shown by curve 110 in FIG. 1, the tolerance at 1-dB OSNR penalty is ±700 ps/nm, and the tolerance at 2-dB OSNR penalty is ±1,100 ps/nm.

In the linear limit, for chirp-free 10-Gbps NRZ signal transmission, chromatic dispersion penalty can be reduced by periodical dispersion compensations with fixed length DCFs in fiber links. But after long distance transmission, nonlinear effects in optical fibers may significantly reduce dispersion tolerance and greatly increase the difficulty of dispersion compensation. For example, self phase modulation (SPM) can significantly impact the dispersion tolerance of a transmission system. SPM is usually caused by the Kerr's effect, with which the effective index of refraction of an optical fiber changes with the intensity of an optical signal. Hence the phase velocity of an intensity-modulated optical signal is different in the different temporal sections of the signal. For example, the high intensity sections representing the logical "1"s experience a slower phase velocity than the low intensity sections representing the logical "0"s. After the transmission, there is an optical phase shift, $\Phi_{SPM}$, between the two sections.

Mathematically, the signal intensity induced phase shift is described by $$\phi_{SPM}(t) = \gamma \times P(t) \times L_{EFF} \quad \text{(Equation 2)}$$

where γ is the nonlinear coupling coefficient, which depends on the type of optical fiber. P(t) is the launching optical signal power entering the optical fiber, and $L_{EFF}$ is the effective length for the nonlinear interaction. For example, $L_{EFF}$ is about 20 km. In another example, a single mode fiber has a fiber core of 80 μm². A NRZ signal with an average launching power of 3 dBm or 2 mW would experience a SPM-induced phase shift $\Phi_{SPM}$ of about 0.11 radians on all the "1" pulses from a single fiber span. For multi-span transmission, a DCF and an optical amplifier are inserted at the end of each span to recover the signal to its original form. Thus the nonlinear phase shift will accumulate with each span, and the total phase shift is given by $$\phi_{SPM}(t) = \gamma \times P(t) \times L_{EFF} \times N_{SPAN} \quad \text{(Equation 3)}$$

where $N_{SPAN}$ is the number of fiber spans. At "0" levels, the signal intensity is lower and the phase shift is smaller than at "1" levels. Thus, a frequency modulation such as a chirp would occur at the transition sections between the "0" and "1" levels. The magnitude of the frequency modulation is given by the time derivative of $\Phi_{SPM}(t)$ as follows.

$$\Delta v_{SPM}(t) = -\frac{1}{2\pi} \times \frac{d\phi_{SPM}(t)}{dt} \quad \text{(Equation 4)}$$

For example, dense wavelength division multiplexing (DWDM) transmission is carried out in 4 to 5 spans of single mode fibers (SMFs). Hence the accumulative nonlinear phase may equal about 0.5 radians. If the rise time is about 30 ps, a chirp of −2.7 GHz would appear on the rising edge of signal pulses without taking into account any dispersion effects. Similarly, if the fall time is about 30 ps, a chirp of +2.7 GHz would appear on the falling edge of signal pulses without taking into account any dispersion effects. The small broadening in spectral bandwidth usually result in a dispersion tolerance window only slightly narrower than that for the back-to-back measurement.

For extended long haul (ELH) transmission over tens or more of fiber spans, the chirp is significant. For example, transmission of 2400 km in 30 spans of SMFs may cause a phase shift of π and a chirp of about −16 GHz or +16 GHz on the rising or falling edge of signal pulses respectively. Optical signals with such large chirps may result in a significantly narrowed window in dispersion tolerance. For example, as discussed above and shown in FIG. 1, for a chirp-free NRZ signal, back-to-back dispersion tolerance at 2-dB OSNR penalty is about 2200 ps/nm. After transmission of 2400 km in 30 fully compensated SMF spans with an average launching power of 3.6 dBm, the dispersion tolerance may be reduced to 600 ps/nm at 2-dB OSNR penalty as shown by curve 120. In certain applications, 600 ps/nm is much smaller than a desired value of 1000 ps/nm.

Also seen in FIG. 1, the center of the dispersion tolerance window is shifted to +600 ps/nm. This shift depends on the launching power and on the details of the inline dispersion compensation arrangement. These conditions usually cannot be precisely controlled in practice due to the gain ripples in optical amplifiers, Raman tilts, variable distance in each fiber span, and other engineering issues. The center of the dispersion tolerance window thus often varies in random, making the effective dispersion tolerance window even smaller.

Hence the transmission technology based on simple NRZ modulation format may suffer greatly from narrow effective dispersion tolerance window in extended long haul (ELH) transmission. The accumulative SPM effect in optical fiber routes with a large number of spans may reduce the dispersion tolerance of a transmission system. The narrow dispersion tolerance often increases the difficulty in the network deployment and reduces the network reliability due to variations of cumulative dispersion over time.

Figure 2:
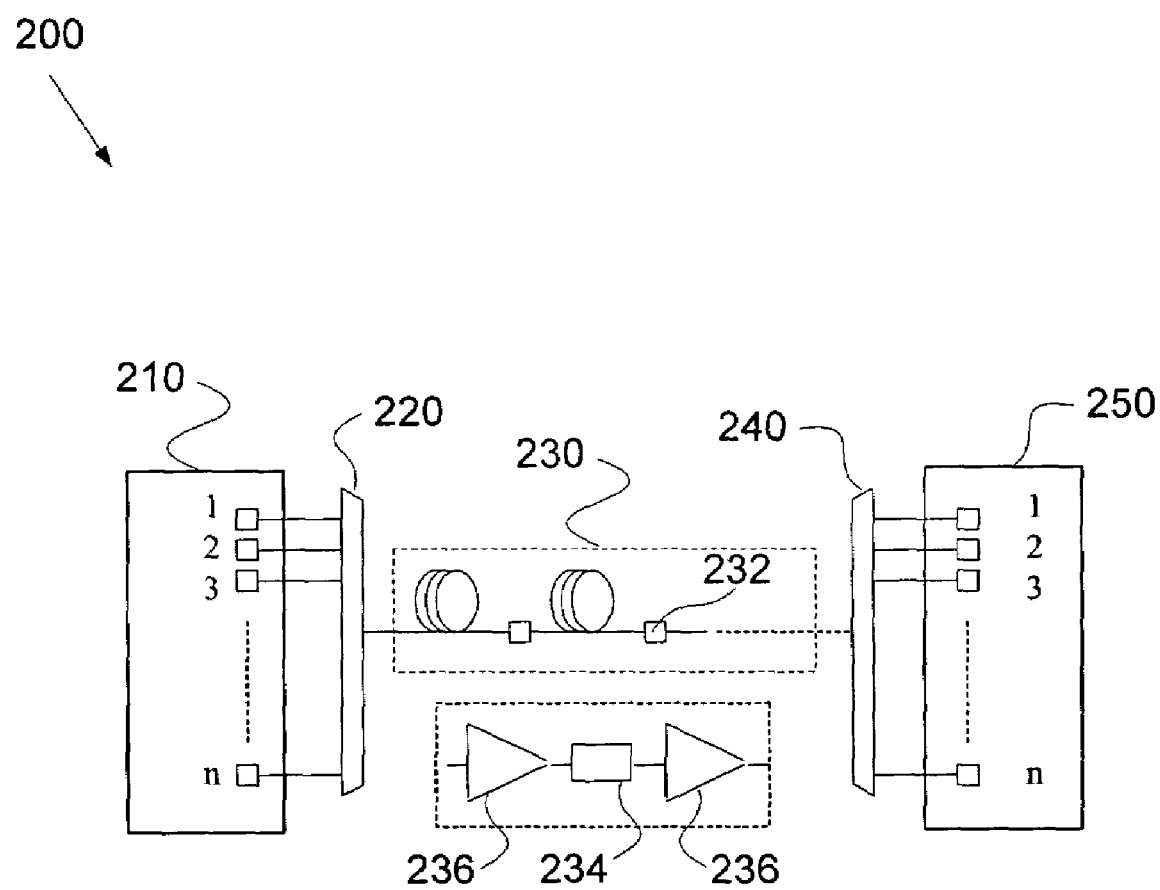
FIG. 2 is a simplified conventional DWDM transmission system.

FIG. 2 is a simplified conventional DWDM transmission system. The system 200 includes optical transmitters 210, a wavelength division multiplexing (WDM) multiplexer 220, a dispersion compensated transmission line system 230, a WDM demultiplexer 240, and optical receivers 250. The optical transmitters 210 includes optical transmitters 1, 2, ..., n, where n is a positive integer. The optical transmitters 210 are connected to the WDM multiplexer 220. The multiplexer 220 receives outputs of the optical transmitters 210 and generates a multiplexed optical signal. The multiplexed optical signal is transmitted via the dispersion compensated transmission line system 230. The dispersion compensated transmission line system 230 includes multiple spans and multiple optical amplifier systems 232. Each optical amplifier system is placed between each pair of adjacent spans and includes a fixed dispersion compensation module 234 and amplifiers 236. For example, the fixed dispersion compensation module 234 comprises a dispersion compensation fiber. The multiplexed optical signal is received by the WDM demultiplexer 240 which generates optical signals. The optical signals are received by the optical receivers 250 including optical receivers 1, 2, ..., n and corresponding to the optical transmitters 210 respectively. n is a positive integer.

Figure 3:
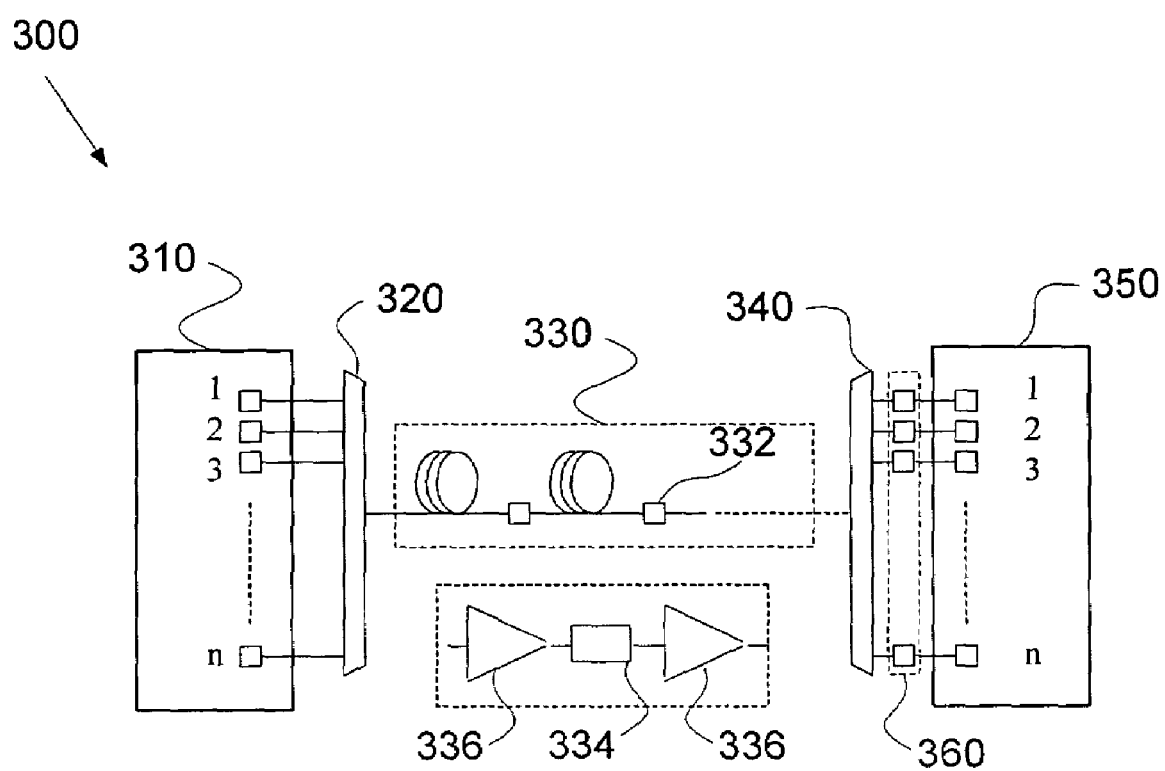
FIG. 3 is a simplified conventional DWDM transmission system with adjustable optical dispersion compensators.

FIG. 3 is a simplified conventional DWDM transmission system with adjustable optical dispersion compensators. The system 300 includes optical transmitters 310, a WDM multiplexer 320, a dispersion compensated transmission line system 330, a WDM demultiplexer 340, adjustable dispersion compensators 360, and optical receivers 350. The optical transmitters 310 includes optical transmitters 1, 2, ..., n, where n is a positive integer. The optical transmitters 310 are connected to the WDM multiplexer 320. The multiplexer 320 receives outputs of the optical transmitters 310 and generates a multiplexed optical signal. The multiplexed optical signal is transmitted via the dispersion compensated transmission line system 330. The dispersion compensated transmission line system 330 includes multiple spans and multiple optical amplifier systems 332. Each optical amplifier system is placed between each pair of adjacent spans and includes a fixed dispersion compensation module 334 and amplifiers 336. For example, the fixed dispersion compensation module 334 comprises a dispersion compensation fiber. The multiplexed optical signal is received by the WDM demultiplexer 340 which generates optical signals. The optical signals are received by the adjustable dispersion compensators 360 including dispersion compensators 1, 2, ..., n. The adjustable dispersion compensators 360 output optical signals to the optical receivers 250 including optical receivers 1, 2, ..., n and corresponding to the optical transmitters 210 respectively. n is a positive integer.

Figure 4:
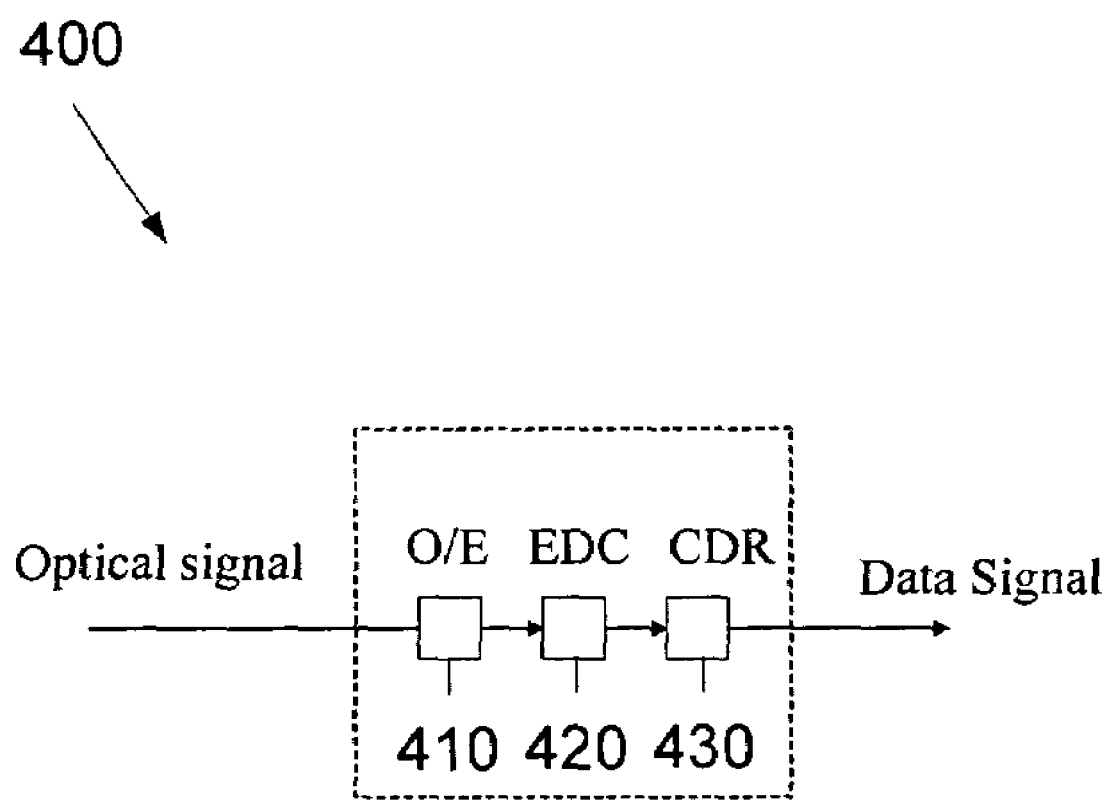
FIG. 4 is a simplified conventional receiver with adjustable electronic dispersion compensator.

FIG. 4 is a simplified conventional receiver with adjustable electronic dispersion compensator. The receiver 400 includes an optical-to-electrical (O/E) converter 410, an adjustable electronic dispersion compensator (EDC) 420, and a clock and data recovery (CDR) device 430. The receiver 400 receives an optical signal and outputs a data signal.

Certain embodiments of the present invention provide an adaptive transmitter for automatically adjusting a modulation parameter in its output signal in response to the cumulative dispersion in a fiber route. These embodiments are related to the shift of the center of the dispersion tolerance window. For example, after long distance transmission the center of the dispersion tolerance window of a NRZ signal is often shifted from substantially 0 ps/nm to some positive cumulative dispersion value as shown in FIG. 1. This shift is characteristic of pulse transmission in fibers with positive dispersion.

Additionally, these embodiments of the present invention related to an effect described in U.S. patent application Ser. Nos. 09/642,033 and 09/802,222, which are incorporated by reference herein for all purposes. A clockwise modulation on a directly modulated laser (DML) diode synchronous to an external NRZ data modulation produces an optical signal in the form of chirped return-to-zero (CRZ) format. The frequency chirp such generated has similar functional form but opposite sign to that generated by the self phase modulation. Specifically, the frequency chirp is described as follows.

$$\Delta v_{CRZ}(t) \propto \frac{dP(t)}{dt}$$ (Equation 5)

As the optical signal traverse the fiber line, the initial chirp as described in Equation 5 is gradually depleted by the SPM. Before the initial chirp is totally depleted, the optical spectrum of the signal becomes gradually narrower instead of broader as for an NRZ signal. A properly designed dispersion compensation scheme can slow down depletion of the initial chirp and improves the ability to reduce SPM caused distortion. Since the signal spectrum is depleted by SPM, instead of being broadened as in NRZ, the dispersion tolerance becomes larger after transmission. Thus a chirped optical signal with broad bandwidth could actually transmit farther than a chirp-free signal with narrow bandwidth because the chirped optical signal can reduce the SPM distortion.

Figure 5:
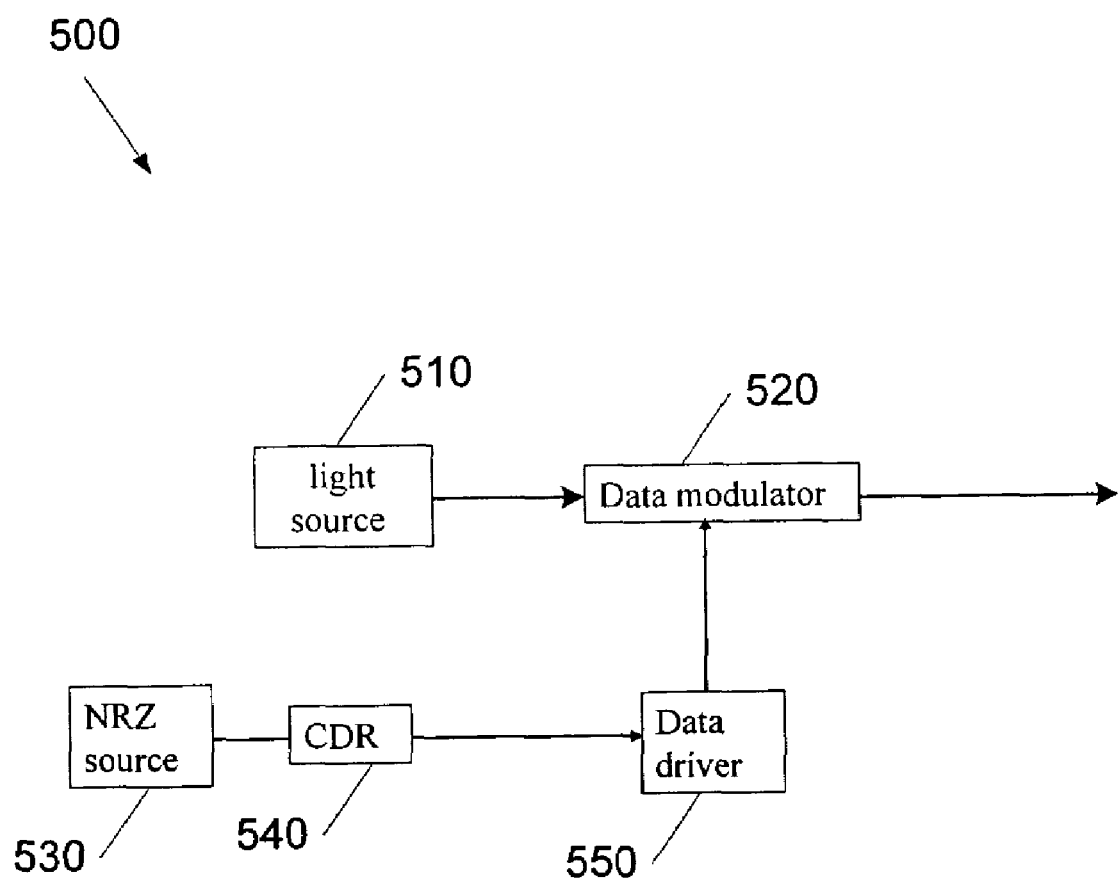
FIG. 5 is a simplified conventional NRZ transmitter.

FIG. 5 is a simplified conventional NRZ transmitter. The NRZ transmitter 500 includes a light source 510, a data modulator 520, an NRZ source 530, a clock and data recovery (CDR) device 540, and a data driver 550. For example, the light source 510 includes a CW diode laser, and the data modulator 520 includes an electro-optical modulator. An incoming electrical NRZ signal from the NRZ source 530 is re-conditioned by the clock and data recovery device 540. The data output from the clock and data recovery device 540 is then amplified to drive the data modulator 520 through the data driver 550. The data modulator 520 converts the signal from the light source 510 to an NRZ optical signal.

Figure 6:
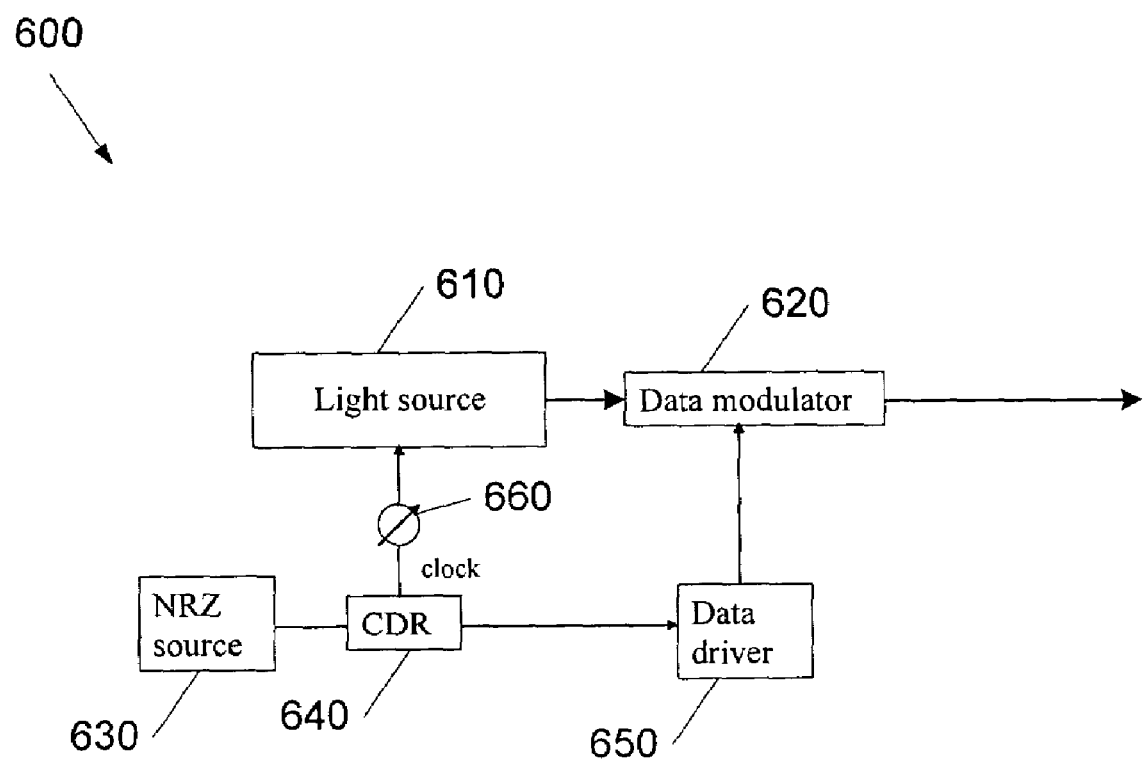
FIG. 6 is a simplified CRZ transmitter.

FIG. 6 is a simplified CRZ transmitter. This diagram is merely an example, which should not unduly limit the scope of the claims. One of ordinary skill in the art would recognize many variations, alternatives, and modifications. The CRZ transmitter 600 includes a light source 610, a data modulator 620, an NRZ source 630, a clock and data recovery (CDR) device 640, a data driver 650, and a phase shifter 660. For example, the light source 610 includes a directly modulated laser which generates clockwise, pulsed light. The data modulator 620 includes an electro-optical modulator. An incoming electrical NRZ signal from the NRZ source 630 is re-conditioned by the clock and data recovery device 640. The data output from the clock and data recovery device 640 is then amplified to drive the data modulator 620 through the data driver 650. The data modulator 620 converts the signal from the light source 610 to a CRZ optical signal. Additionally, the clock output from the clock and data recovery device 640 is used to drive the light source 610 through the phase shifter 660. The phase shifter 660 provides certain time delay adjustment between the clock output and the data output to ensure the temporal overlap between the optical clock pulses and the data modulation. See U.S. patent application Ser. No. 09/642,033, which is incorporated by reference herein for all purposes.

The optical pulses of the CRZ signal generated by the CRZ transmitter 600 each have a positive frequency chirp, and the magnitude of such frequency chirp depends significantly on the driving voltage, the driving current or the driving RF power on the directly modulated laser. During transmission of the CRZ signal, before the initial chirp is totally depleted, the center of the dispersion tolerance window should usually remain substantially at about 0 ps/nm, or at about −100 ps/nm where the CRZ pulses compress. In contrast, the center of the dispersion tolerance window for an NRZ signal, which does not possess an initial chirp, can be shifted to some positive value such as 500 to 600 ps/nm as exemplified in FIG. 1.

After the initial chirp on the CRZ signal is totally depleted, the SPM starts to produce a chirp with negative sign, and the optical spectrum becomes gradually broader in a similar manner as that for an NRZ signal. The center of the dispersion tolerance window may also be gradually shifted from about 0 ps/nm towards that for the NRZ signal. In other words, if the magnitude of the initial chirp is gradually reduced, the chirp will be depleted at a gradually shorter distance. For given transmission distance of sufficient length, the center of the dispersion tolerance window can be gradually shifted from about 0 ps/nm to the positive side as the chirp is being reduced.

Figure 7:
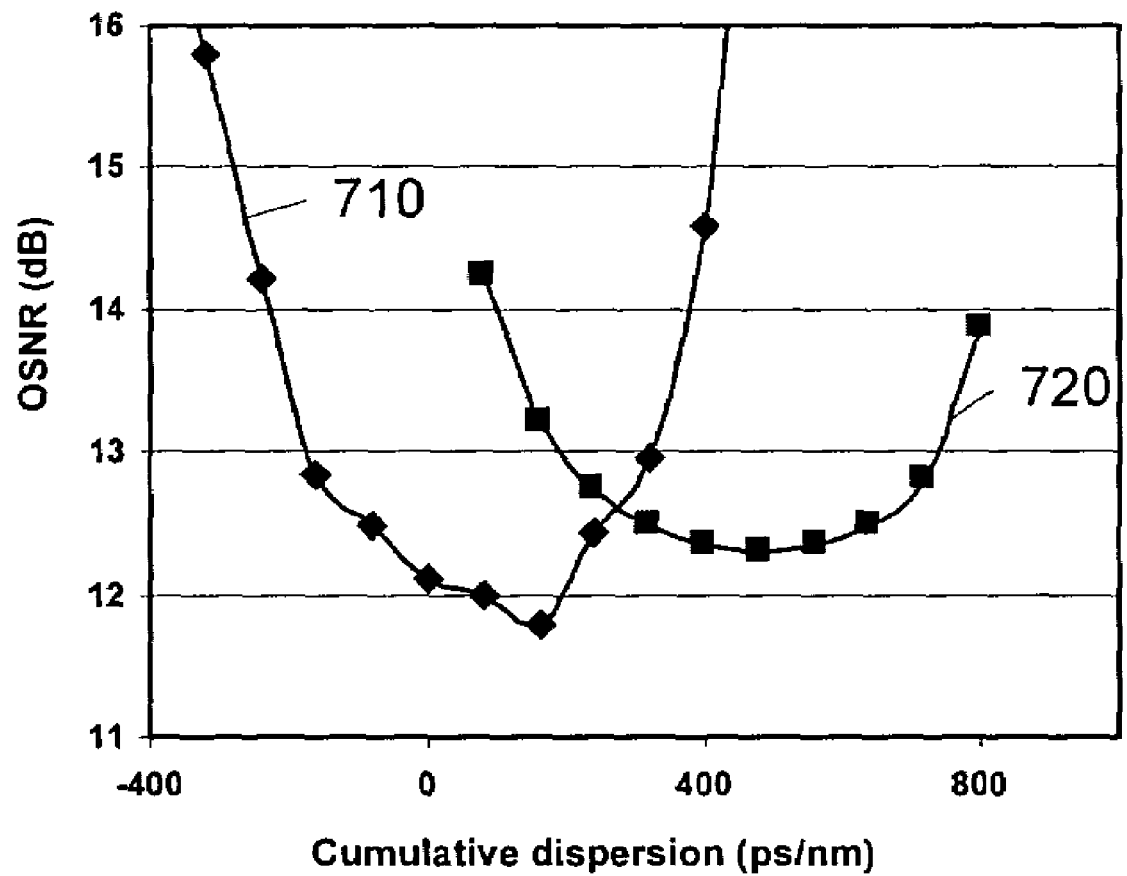
FIG. 7 shows simplified dispersion tolerances for CRZ signals.

FIG. 7 shows simplified dispersion tolerances for CRZ signals. This diagram is merely an example, which should not unduly limit the scope of the claims. One of ordinary skill in the art would recognize many variations, alternatives, and modifications. The curves 710 and 720 are dispersion tolerances after transmission of 2400 km for two CRZ signals. The two CRZ signals are generated with different driving RF powers on the directly modulated laser (DML). Other conditions for obtaining the curves 710 and 720 are substantially the same as those for obtaining the curve 120 in FIG. 1. The curve 710 corresponds to a fully modulated CRZ signal, which means the clock modulation current on the DML swings from the laser threshold current to twice as high as the average current. The clock modulation current includes both AC and DC components. In such fully modulated mode, the contrast ratio between the peak and the valley of the optical clock pulses is about 10 dB. The center of the dispersion tolerance window is substantially at about 0 ps/nm.

The curve 720 corresponds to a CRZ signal with reduced modulation. The driving RF power on the DML is lowered by 13 dB, which means the AC driving current is lowered to 22.4%. As can be seen, the center of the dispersion tolerance window is shifted to +500 ps/nm. The contrast ratio of the optical clock pulses under reduced modulation is only about 3 dB. The signal is no longer strictly "return-to-zero," but due to the frequency chirp the pulses can be compressed to the "return-to-zero" format with a contrast ratio close to 10 dB using a segment dispersion compensation fiber. For example, the dispersion compensation fiber may provide about a compensation of about −200 ps/nm. Thus the signal still retains a 1-dB gain in OSNR over the NRZ signal.

Figure 8:
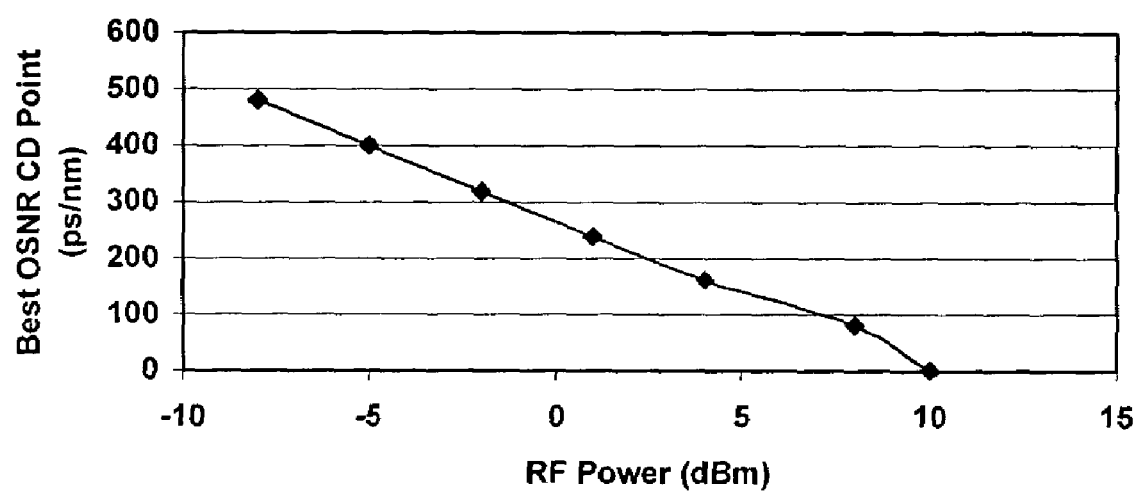
FIG. 8 shows a simplified relationship between center of dispersion tolerance window and RF driving power to DML for CRZ signals.

FIG. 8 shows a simplified relationship between center of dispersion tolerance window and RF driving power to DML for CRZ signals. This diagram is merely an example, which should not unduly limit the scope of the claims. One of ordinary skill in the art would recognize many variations, alternatives, and modifications. As the RF driving power decreases, the center of the dispersion tolerance window, signified by the lowest OSNR required for a given BER, shifts monotonously to the positive cumulative dispersion.

Figure 9:
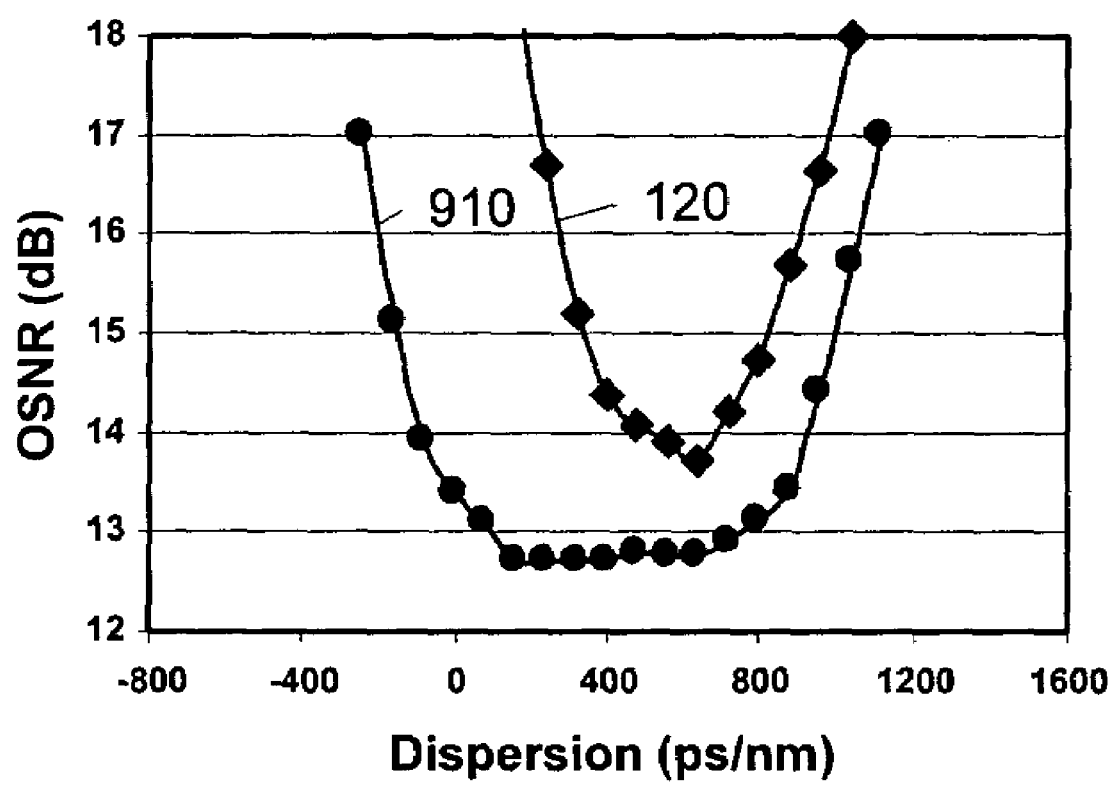
FIG. 9 shows a simplified dispersion tolerance for CRZ signal from an adaptive CRZ transmitter.

FIG. 9 shows a simplified dispersion tolerance for CRZ signal from an adaptive CRZ transmitter. This diagram is merely an example, which should not unduly limit the scope of the claims. One of ordinary skill in the art would recognize many variations, alternatives, and modifications. In obtaining the dispersion tolerance curve, the received signal after transmission of 2400 km is optimized at each value of cumulative dispersion by continuously adjusting the driving RF power on the DML to get lowest OSNR for BER of about $10^{-5}$. All other conditions for obtaining the curve 910 are substantially the same as those of the curve 120 in FIG. 1. As can be seen, the adaptive transmitter gives a dispersion tolerance 1200 ps/nm. For comparison, the curve 120 in FIG. 1 is also shown in FIG. 9.

Figure 10:
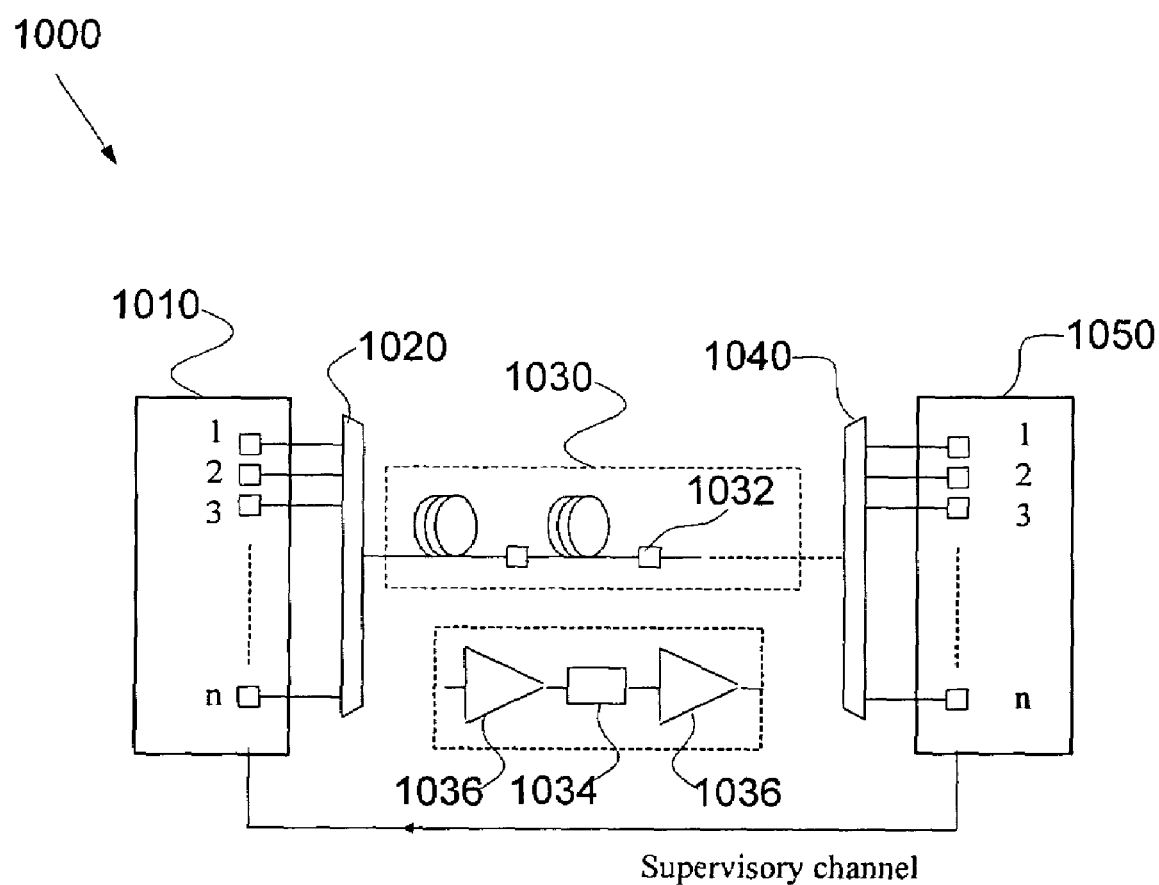
FIG. 10 is a simplified DWDM transmission system according to an embodiment of the present invention.

FIG. 10 is a simplified DWDM transmission system according to an embodiment of the present invention. This diagram is merely an example, which should not unduly limit the scope of the claims. One of ordinary skill in the art would recognize many variations, alternatives, and modifications. The system 1000 includes optical transmitters 1010, a WDM multiplexer 1020, a dispersion compensated transmission line system 1030, a WDM demultiplexer 1040, and optical receivers 1050. Although the above has been shown using a selected group of apparatuses for the system 1000, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

Figure 11:
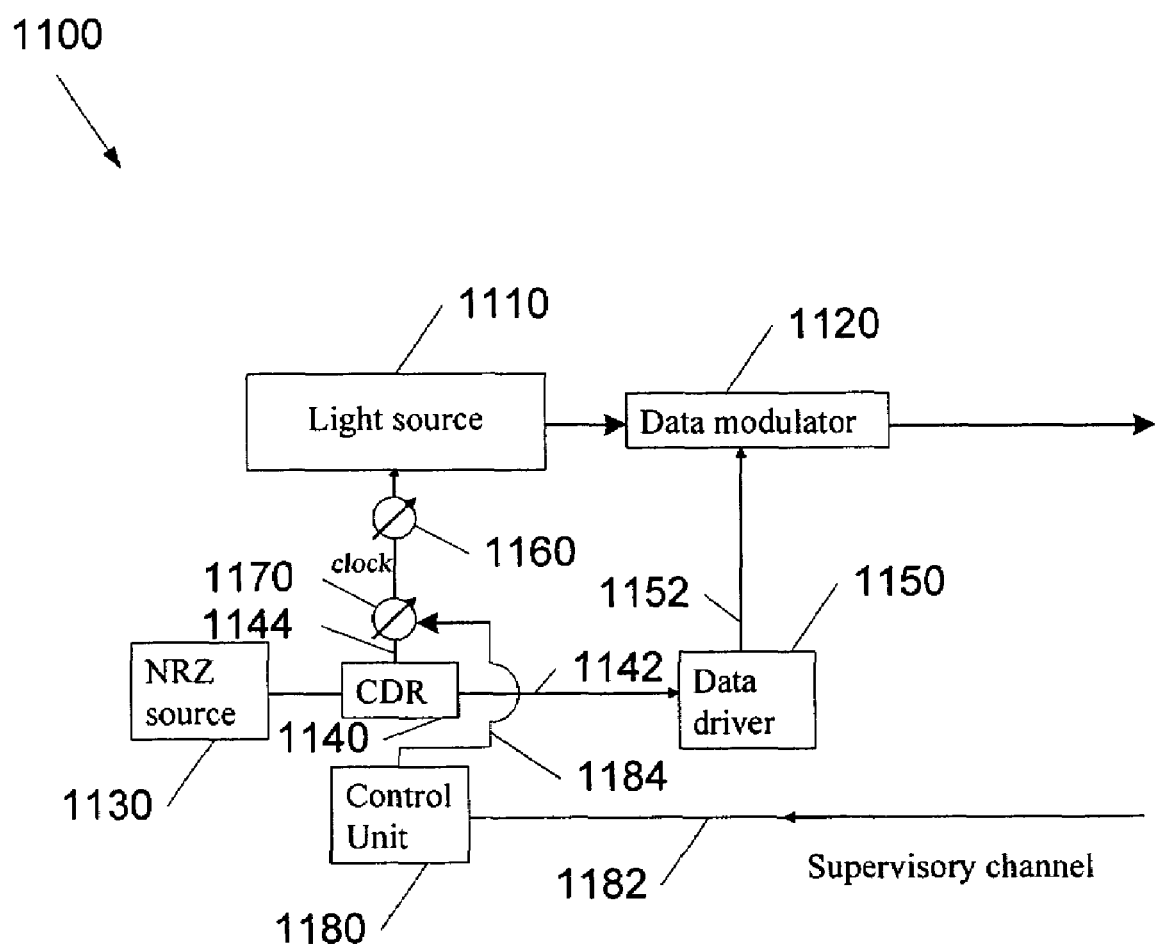
FIG. 11 is a simplified adaptive transmitter according to an embodiment of the present invention.

The optical transmitters 1010 includes optical transmitters 1, 2, . . . , n, where n is a positive integer. The optical transmitters 1010 are connected to the WDM multiplexer 1020 and the optical receivers 1050. FIG. 11 is a simplified adaptive transmitter according to an embodiment of the present invention. This diagram is merely an example, which should not unduly limit the scope of the claims. One of ordinary skill in the art would recognize many variations, alternatives, and modifications. The adaptive transmitter 1100 is one of the optical transmitters 1010, and includes a light source 1110, a data modulator 1120, an NRZ source 1130, a clock and data recovery (CDR) device 1140, a data driver 1150, a phase shifter 1160, an adjustment system 1170, and a control system 1180. Although the above has been shown using a selected group of apparatuses for the system 1100, there can be many alternatives, modifications, and variations. For example, some of the apparatuses may be expanded and/or combined. The adjustment system 1170 may be combined with the clock and data recovery device 1140. Other apparatuses may be inserted to those noted above. Depending upon the embodiment, the arrangement of apparatuses may be interchanged with others replaced. Further details of these apparatuses are found throughout the present specification and more particularly below.

The NRZ source 1130 generates an electrical NRZ signal, which is received and re-conditioned by the clock and data recovery (CDR) device 1140. The clock and data recovery device 1140 generates a data signal 1142 and a clock signal 1144. The data signal 1142 is received and amplified by the data driver 1150. The data driver 1150 generates a signal 1152 to drive the data modulator 1120.

The light source 1110 includes a directly modulated laser (DML) and outputs light to the data modulator 1120. For example, the light source 1110 generates a clockwise, pulsed light. The data modulator 1120 includes an electro-optical modulator. The data modulator 1120 converts the light from the light source 1110 to a CRZ optical signal 1122 in response to the signal 1152. The CRZ signal 1122 includes optical pulses with corresponding chirps determined by the control system 1180 and the adjustment system 1170.

The control system 1180 receives a feedback signal 1182. For example, the feedback signal 1182 is transmitted over a supervisory channel of the DWDM transmission system 1000. The control system 1180 outputs a control signal 1184 to the adjustment system 1170. The clock and data recovery device 1140 receives the electrical NRZ signal from the NRZ source 1130 and in response generates the data signal 1142 and the clock signal 1144. The electrical NRZ signal carries data information.

The clock signal 1144 from the clock and data recovery device 1140 is used to drive the light source 1110 through the adjustment system 1170 and the phase shifter 1160. The adjustment system 1170 adjusts the magnitude of the clock signal 1144 in response to the control signal 1184. The adjusted clock signal 1144 determines the magnitude of the drive current, the drive voltage, or the drive RF power for the directly modulated laser in the light source 1110. The driving voltage, the driving current or the driving RF power can affect the magnitude of frequency chirp associated with the optical pulses of the CRZ signal 1122. For example, the adjustment system 1170 includes an attenuator. The phase shifter 1160 provides certain time delay adjustment between the clock signal 1144 and the data signal 1142 to ensure the temporal overlap between the optical clock pulses and the data modulation.

The multiplexer 1020 receives outputs of the optical transmitters 1010 and generates a multiplexed optical signal. The multiplexed optical signal is transmitted via the dispersion compensated transmission line system 1030. The dispersion compensated transmission line system 1030 includes multiple spans and multiple optical amplifier systems 1032. Each optical amplifier system is placed between each pair of adjacent spans and includes a fixed dispersion compensation module 1034 and amplifiers 1036. For example, the fixed dispersion compensation module 1034 comprises a dispersion compensation fiber. The multiplexed optical signal is received by the WDM demultiplexer 1040 which generates optical signals.

Figure 12:
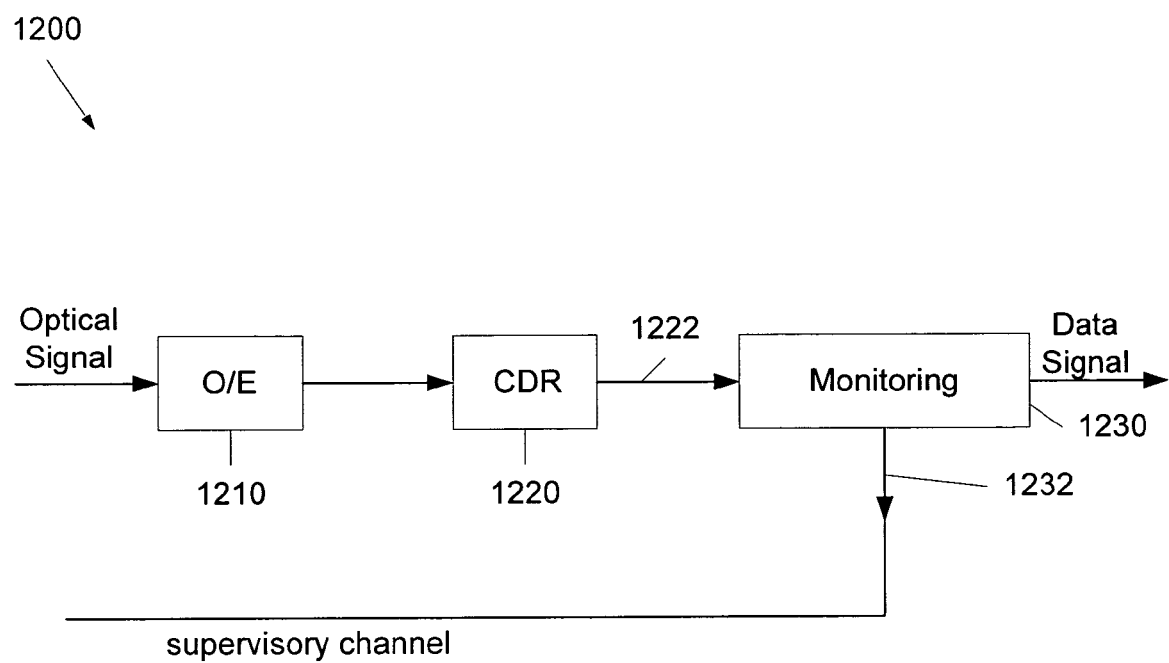
FIG. 12 is a simplified receiver according to an embodiment of the present invention.

The optical receivers 1050 receive the optical signals from the WDM demultiplexer 1040. The optical receivers 1050 includes optical receivers 1, 2, . . . , n and corresponds to the optical transmitters 210 respectively. n is a positive integer. FIG. 12 is a simplified receiver according to an embodiment of the present invention. This diagram is merely an example, which should not unduly limit the scope of the claims. One of ordinary skill in the art would recognize many variations, alternatives, and modifications. The receiver 1200 is one of the optical receivers 1050 and includes an optical-to-electrical (E/O) converter 1210, a clock and data recovery (CDR) device 1220, and a monitoring device 1230. The receiver 1200 receives an optical signal and outputs a data signal. Although the above has been shown using a selected group of apparatuses for the system 1200, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the output signal from the CDR device 1220 may traverse over two signal routes. One route enters the monitoring device 1230, while the other route does not. Further details of these apparatuses are found throughout the present specification and more particularly below.

The optical-to-electrical (O/E) converter 1210 receives an optical signal and generates an electrical signal. The electrical signal is received by the clock and data recovery (CDR) device 1220, which reduces the signal distortions of the electrical signal and outputs a data signal 1222 to the monitoring device 1230. The monitoring device 1230 can provide a feedback signal 1232 including information on the quality of the data signal 1222. For example, the monitoring device 1230 includes a forward-error-correction (FEC) chip. The quality of the data signal 1222 is measured by the uncorrected BER reading from the FEC chip. For example, the feedback signal 1232 is transmitted over a supervisory channel of the DWDM transmission system 1000.

As discussed above and further emphasized here, FIGS. 10-12 are merely examples, which should not unduly limit the scope of the claims. One of ordinary skill in the art would recognize many variations, alternatives, and modifications. For example, a first adaptive transmitter as shown in FIG. 11 and a first receiver as shown in FIG. 12 can be combined. The first receiver receives an optical signal from a first segment of an optical network and provides a first feedback signal to a second adaptive transmitter for the first segment of the optical network. The first adaptive transmitter transmits a second optical signal to a second segment of the optical network and receives a second feedback signal from a second receiver for the second segment of the optical network.

Figure 13:
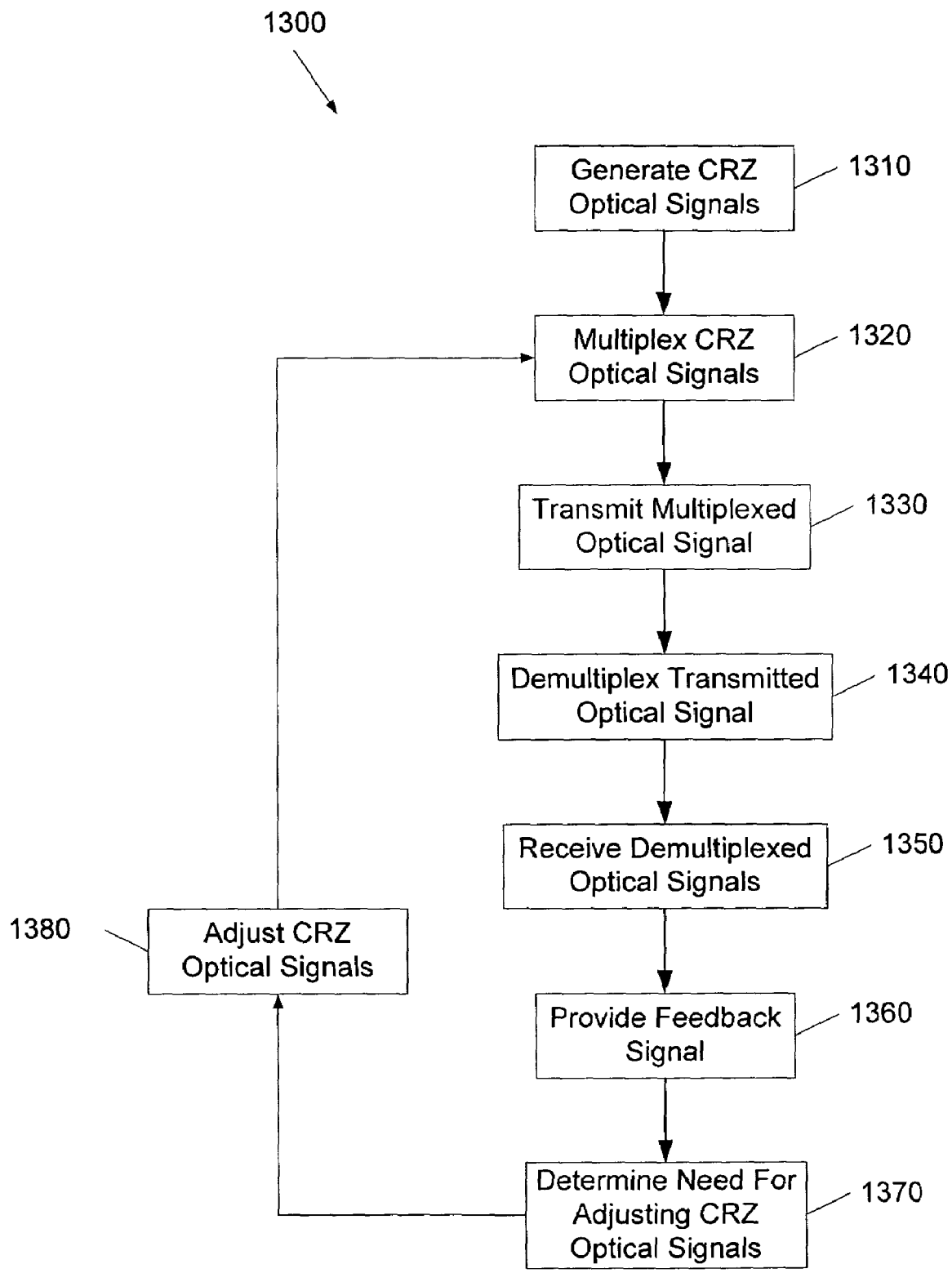
FIG. 13 is a simplified method for automatic chromatic dispersion compensation.

FIG. 13 is a simplified method for automatic chromatic dispersion compensation. This diagram is merely an example, which should not unduly limit the scope of the claims. One of ordinary skill in the art would recognize many variations, alternatives, and modifications. The method 1300 for automatic chromatic dispersion compensation includes process 1310 for generating CRZ optical signals, process 1320 for multiplexing CRZ optical signals, process 1330 for transmitting multiplexed optical signal, process 1340 for demultiplexing transmitted optical signal, process 1350 for receiving demultiplexed optical signals, process 1360 for providing feedback signal, process 1370 for determining need for adjusting CRZ optical signals, and process 1380 for adjusting CRZ optical signals. The method 1300 can be performed by using various types of transmission systems. For example, the transmission system as shown in FIGS. 10, 11 and 12 is used to perform the method 1300. Although the above has been shown using a selected sequence of processes, there can be many alternatives, modifications, and variations. For example, some of the processes may be expanded and/or combined. Other processes may be inserted to those noted above. Depending upon the embodiment, the specific sequences of steps may be interchanged with others replaced. Further details of these processes are found throughout the present specification and more particularly below.

At the process 1310, CRZ optical signals are generated. For example, the CRZ optical signals are outputted from the optical transmitters 1010 respectively. Each of the optical transmitters 1010 includes various components as shown in FIG. 11. At the process 1320, the CRZ optical signals are multiplexed. For example, the CRZ optical signals from the optical transmitters are multiplexed by the WDM multiplexer 1020, which generates a multiplexed optical signal. At the process 1330, the multiplexed optical signal is transmitted. For example, the transmission is carried out over the dispersion compensated transmission line system 1030 including multiple spans and multiple optical amplifier systems 1032. Each optical amplifier system is placed between each pair of adjacent spans and includes a fixed dispersion compensation module 1034 and amplifiers 1036. For example, the fixed dispersion compensation module 1034 comprises a dispersion compensation fiber.

At the process 1340, the transmitted optical signal is demultiplexed. For example, the transmitted optical signal is received by the WDM demultiplexer 1040 which generates demultiplexed optical signals. At the process 1350, the demultiplexed optical signals are received. For example, the optical receivers 1050 receive the demultiplexed optical signals, and each of the optical transmitters 1010 includes various components as shown in FIG. 12.

At the process 1360, a feedback signal is provided. For example, the monitoring device 1230 in one of the optical receivers 1050 can provide a feedback signal 1232 including information on the quality of the data signal 1222. For example, the monitoring device 1230 includes a forward-error-correction (FEC) chip. The quality of the data signal 1222 is measured by the uncorrected BER reading from the FEC chip.

At the process 1370, whether the CRZ optical signals generated at the process 1320 should be adjusted is determined. For example, the feedback signal 1232 is transmitted over a supervisory channel and received by the control system 1180 in one of the optical transmitters 1010 of the DWDM transmission system 1000. If the quality of data signal 1222 is not satisfactory, the CRZ optical signals need to be adjusted and the process 1380 should be performed. If the quality of the data signal 1222 is satisfactory or has substantially reached a limit, the CRZ optical signals does not need to be adjusted. At the process 1380, the CRZ optical signals are adjusted. For example, the adjustment system 1170 in one of the optical transmitters 1010 determines the magnitude of the drive current, the drive voltage, or the drive RF power for the directly modulated laser in the light source 1110.

As discussed above and shown in FIG. 13, the CRZ optical signals can be generated and received individually by their respective optical transmitters and receivers. The quality of each of the received CRZ optical signals can be determined, and such quality information can be transmitted as a feedback signal. The need for adjusting CRZ optical signals can also be determined individually. The adjustment to the CRZ optical signals may be performed to one or more of the CRZ optical signals. Additionally, the adjustment to the CRZ optical signals may be performed more than once in certain applications. To reduce the number of adjustment for a given CRZ optical signal, the driving current, the driving voltage, or the driving RF power may be changed in one direction. If the quality of a given received CRZ optical signal becomes worse, the driving current, the driving voltage, or the driving RF power may be changed in the other direction at the next adjustment. If the quality of a given received CRZ optical signal becomes better, the driving current, the driving voltage, or the driving RF power may be changed further in the same direction at the next adjustment.

The method for automatic chromatic dispersion compensation as discussed above can be used by field engineers during system installations. Additionally, the process can also be automated through a computer program. The system is controlled by a microprocessor, which automatically adjusts the driving current, the driving voltage, or the driving RF power on the directly modulated laser to adapt to the cumulative dispersion mismatch in optical fiber links.

According to another embodiment of the present invention, a computer-readable medium including instructions for transmitting a signal for optical network applications is provided. The computer-readable medium includes one or more instructions for outputting a first chirped return-to-zero signal associated with a first frequency chirp, one or more instructions for outputting a second chirped return-to-zero signal associated with a second frequency chirp, one or more instructions for receiving at least the first chirped return-to-zero signal and the second chirped return-to-zero signal, and one or more instructions for generating a multiplexed optical signal in response to at least the first chirped return-to-zero signal and the second chirped return-to-zero signal. Additionally, the computer-readable medium includes one or more instructions for receiving the multiplexed optical signal, and one or more instructions for generating at least a first optical signal and a second optical signal in response to the multiplexed optical signal. The first optical signal is associated with the first chirped return-to-zero signal, and the second optical signal is associated with the second chirped return-to-zero signal. Moreover, the computer-readable medium includes one or more instructions for receiving the first optical signal, one or more instructions for receiving the second optical signal, one or more instructions for generating a first feedback signal associated with a first characteristic related to the first optical signal, one or more instructions for receiving the first feedback signal, one or more instructions for processing information associated with the first feedback signal, and one or more instructions for adjusting the first frequency chirp based on at least information associated with the first feedback signal.

Some embodiments of the present invention can be applied to extended long haul (ELH) optical transport systems. Nonlinear interaction, such as SPM, causes narrowing of the dispersion tolerance window in ELH transmission links. Certain embodiments of the present invention can significantly improve the performance of high-speed optical networks, such as a 10-Gbp or 40-Gbp optical network.

The present invention has various advantages. Certain embodiments of the present invention provide a method and system for increasing the chromatic dispersion tolerance in extended long haul optical fiber transmission systems, or in other optical fiber transmission systems where the dispersion tolerance is significantly narrowed due to the fiber nonlinearities. Some embodiments of the present invention provide a method and system for generating optical signals that self-adapt to the residual chromatic dispersion in dispersion compensated optical fiber transmission links so that the signals experience minimal distortions at the receivers. Certain embodiments of the present invention adjust the magnitude of the chirp on a CRZ signal in response to the variations in cumulative dispersion in dispersion compensated fiber routes. The adjustment is realized by changing the driving current, the driving voltage, or the driving RF power to a directly modulated laser in a transmitter. Some embodiments of the present invention use a performance-monitoring device on the receiver side. The performance monitoring device generates an output signal that can be used as feedback to control the driving current, the driving voltage, or the driving RF power for a directly modulated laser in a transmitter and therefore optimize the performance of a transmission system. Certain embodiments of the present invention provide a capability of shifting the center of the dispersion tolerance window and hence increasing the system tolerance to variations in cumulative dispersion. Some embodiments of the present invention can lower costs and reduce sizes of adaptive dispersion compensation systems. Certain embodiments of the present invention can adjust the center of the dispersion tolerance window and hence a large dispersion compensation range.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for transmitting a signal for optical network applications, the apparatus comprising:
    a first optical transmitter;
    wherein the first optical transmitter comprises:
        a first light source configured to generate a first laser signal in response to a first laser drive signal, the first laser signal being characterized by a frequency chirp magnitude;
        a first data modulator configured to receive the first laser signal and a first data drive signal and output a first chirped partially return-to-zero signal, a modulation depth of the chirped partially return-to-zero signal being adjustable by a driving RF power of the light source;
        a first signal source configured to generate a first non-return-to-zero signal;
        a first clock and data recovery system configured to receive the first non-return-to-zero signal and generate the first laser drive signal and a first data control signal, the first laser drive signal being capable of modifying at least the frequency chirp magnitude;
        a first data driver configured to receive the first data control signal and generate the first data drive signal;
        a first adjustment system configured to receive a first laser control signal and the first laser drive signal and adjusts an amplitude of the first laser drive signal in response to the first laser control signal;
        a first control system configured to receive a first input signal from an optical receiver and output the first laser control signal in response to the first input signal, the first input signal being associated with the first chirped partially return-to-zero signal.

2. The apparatus of claim 1 wherein the first optical transmitter further comprises a first phase shifter configured to provide a first phase shift to the first laser drive signal and coupled to at least the first light source.

3. The apparatus of claim 1 wherein the first laser drive signal is associated with at least a first laser drive current, a first laser drive voltage, or a first laser drive RF power.

4. The apparatus of claim 3 wherein the first chirped partial return-to-zero signal is associated with a first frequency chirp, the first frequency chirp dependent upon at least a first laser drive current, a first laser drive voltage, or a first laser drive RF power.

5. The apparatus of claim 1 wherein the first input signal is associated with a first characteristic related to a first data signal.

6. The apparatus of claim 5 wherein the first input signal is associated with a first bit-error-ratio related to the first data signal.

7. The apparatus of claim 1, and further comprising:
    a first optical receiver;
    wherein the first optical receiver comprises:
        a first optical-to-electrical converter configured to receive a first transmitted optical signal;

a second clock and data recovery system coupled to the first optical-to-electrical converter and generate a first received data signal;
a first monitoring system configured to receive the first received data signal and output at least a first output signal.

8. The apparatus of claim 7 wherein the first output signal is associated with a first characteristic related to the first received data signal.

9. The apparatus of claim 8 wherein the first output signal is associated with a first bit-error-ratio related to the first received data signal.

10. The apparatus of claim 7 wherein the first output signal is substantially the same as the first input signal.

11. The apparatus of claim 10 wherein the first output signal is transmitted over a supervisory channel and received by the first control system as the first input signal.

12. The apparatus of claim 11 wherein the first laser drive signal is associated with at least a first laser drive current, a first laser drive voltage, or a first laser drive RF power.

13. The apparatus of claim 12 wherein the first chirped partially return-to-zero signal is associated with a first frequency chirp, the first frequency chirp dependent upon at least the first laser drive current, the first laser drive voltage, or the first laser drive RF power.

14. A system for transmitting a signal for optical network applications, the system comprising:
    a first optical transmitter configured to output a first chirped partially return-to-zero signal associated with a first frequency chirp using a drive signal, the first chirped return-to-zero signal being characterized by at least a first magnitude, a modulation depth of the first chirped partially return-to-zero signal being adjustable by a driving RF power of a light source;
    a second optical transmitter configured to output a second chirped return-to-zero signal associated with a second frequency chirp;
    a multiplexing system configured to receive at least the first chirped return-to-zero signal and the second chirped return-to-zero signal and generate a multiplexed optical signal;
    an optical transmission system configured to receive the multiplexed optical signal;
    a demultiplexing system coupled to the optical transmission system and configured to generate at least a first optical signal and a second optical signal, the first optical signal associated with the first chirped partially return-to-zero signal, the second optical signal associated with the second chirped return-to-zero signal;
    a first optical receiver configured to receive the first optical signal, the first optical signal being associated with the first chirped partially return-to-zero signal;
    a second optical receiver configured to receive the second optical signal; wherein
    the first optical receiver is further configured to generate a first feedback signal associated with a first characteristic related to the first optical signal;
    the first optical transmitter comprising:
        a first light source configured to generate a first laser signal in response to a first laser drive signal, the first laser signal being characterized by a frequency chirp magnitude;
        a first data modulator configured to receive the first laser signal and a first data drive signal and output the chirped partially return-to-zero signal;
        a first signal source configured to generate a first non-return-to-zero signal;
        a first clock and data recovery system configured to receive the first non-return-to-zero signal and generate the first laser drive signal and a first data control signal, the first laser drive signal being capable of modifying at least the frequency chirp magnitude;
        a first data driver configured to receive the first data control signal and generate the first data drive signal;
        a first control system configured to receive the first feedback signal, process information associated with the first feedback signal and output a first laser control signal,
        a first adjustment system configured to receive the first laser control signal and the first laser drive signal and adjusts an amplitude of the first laser drive signal in response to the first laser control signal.

15. The apparatus of claim 14 wherein the first characteristic is associated with a first bit-error-ratio related to the first optical signal.

16. A method for transmitting a signal for optical network applications, the method comprising:
    receiving a first input signal from an optical receiver;
    outputting a first laser control signal in response to the first input signal;
    generating a first non-return-to-zero signal;
    receiving the first non-return-to-zero signal;
    generating a first laser drive signal and a first data control signal in response to the first non-return-to-zero signal;
    receiving the first laser driver signal and the first laser control signal by a adjustment component;
    adjusting an amplitude of the first laser drive signal in response to the first laser control signal;
    receiving the first laser drive signal by a control component;
    generating a first laser signal in response to the first laser drive signal;
    receiving the first data control signal;
    generating a first data drive signal in response to the first data control signal;
    receiving the first laser signal and the first data drive signal;
    generating an output signal in response to the first laser signal and the first data drive signal, the output signal being characterized by a frequency chirp magnitude, the frequency chirp being associated with the amplitude, the output signal being associated with a chirped partially return-to-zero format, the modulation depth of the chirped partially return-to-zero signal being adjusted by a driving RF power on the light source.

17. The method of claim 16, and further comprising:
    providing a first phase shift to the first laser drive signal;
    wherein the first laser signal is generated in response to the phased-shifted first laser drive signal.

18. The method of claim 17 wherein the first laser drive signal is associated with at least a first laser drive current, a first laser drive voltage, or a first laser drive RF power.

19. The method of claim 18 wherein the first chirped return-to-zero signal is associated with a first frequency chirp, the first frequency chirp dependent upon at least a first laser drive current, a first laser drive voltage, or a first laser drive RF power.

20. The method of claim 19 wherein the first input signal is associated with a first characteristic related to a first data signal.

21. The method of claim 20 wherein the first input signal is associated with a first bit-error-ratio related to the first data signal.

22. A method for transmitting a signal for optical network applications, the method comprising:

outputting a first output signal associated with a first frequency chirp by a first transmitter, the first frequency chirp being characterized by at least a magnitude, the first output signal being associated with a partially return-to-zero format, a modulation depth of the output signal being adjustable by a driving RF power of the light source;

outputting a second output signal associated with a second frequency chirp by a second transmitter;

receiving at least the first output signal and the second output signal;

generating a multiplexed optical signal in response to at least the first output signal and the second output signal;

receiving the multiplexed optical signal; generating at least a first optical signal and a second optical signal in response to the multiplexed optical signal, the first optical signal associated with the first output signal, the second optical signal associated with the second output signal;

receiving the first optical signal from an optical receiver; receiving the second optical signal;

generating a first feedback signal associated with a first characteristic related to the first optical signal;

wherein the outputting a first output signal comprising:

generating a first laser signal in response to a first laser drive signal, the first laser signal being characterized by a frequency chirp magnitude;

receiving the first laser signal and a first data drive signal and outputting the chirped partially return-to-zero signal;

generating a first non-return-to-zero signal;

receiving the first non-return-to-zero signal and generate the first laser drive signal and a first data control signal, the first laser drive signal being capable of modifying at least the frequency chirp magnitude;

receiving the first data control signal and generate the first data drive signal;

receiving the first feedback signal; processing information associated with the first feedback signal;

adjusting the magnitude of first frequency chirp by varying an amplitude of a drive signal based on at least information associated with the first feedback signal.

23. The method of claim 22 wherein the adjusting the first frequency chirp comprises:

determining whether the first frequency chirp should be adjusted based on at least information associated with the first feedback signal;

only if the first frequency chirp should be adjusted, adjusting the first frequency chirp.

24. The method of claim 22 wherein the first characteristic is associated with a first bit-error-ratio related to the first optical signal.

25. A computer-readable medium including instructions for transmitting a signal for optical network applications, the computer-readable medium comprising:

one or more instructions for outputting a first output signal associated with a first frequency chirp by a first transmitter, the first frequency chirp being characterized by a magnitude, the first output signal being associated with a chirped partially return-to-zero format, a modulation depth of the first output signal being adjustable by a driving RF power of the light source;

one or more instructions for outputting a second output signal associated with a second frequency chirp by a second transmitter;

one or more instructions for receiving at least the first output signal and the second output signal;

one or more instructions for generating a multiplexed optical signal in response to at least the first output signal and the second output signal;

one or more instructions for receiving the multiplexed optical signal;

one or more instructions for generating at least a first optical signal and a second optical signal in response to the multiplexed optical signal, the first optical signal associated with the first output signal, the second optical signal associated with the second output signal;

one or more instructions for receiving the first optical signal;

one or more instructions for receiving the second optical signal;

one or more instructions for generating a first feedback signal associated with a first characteristic related to the first optical signal;

one or more instructions for receiving the first feedback signal;

wherein the one or more instructions for outputting a first output signal comprising:

one or more instructions for generating a first laser signal in response to a first laser drive signal, the first laser signal being characterized by a frequency chirp magnitude;

one or more instructions for receiving the first laser signal and a first data drive signal and outputting the chirped partially return-to-zero signal;

one or more instructions for generating a first non-return-to-zero signal;

one or more instructions for receiving the first non-return-to-zero signal and generate the first laser drive signal and a first data control signal, the first laser drive signal being capable of modifying at least the frequency chirp magnitude;

one or more instructions for processing information associated with the first feedback signal;

one or more instructions for adjusting the magnitude of the first frequency chirp by varying an amplitude of a drive signal based on at least information associated with the first feedback signal.

26. The computer-readable medium of claim 25 wherein the one or more instructions for adjusting the first frequency chirp comprises:

one or more instructions for determining whether the first frequency chirp should be adjusted based on at least information associated with the first feedback signal;

one or more instructions for only if the first frequency chirp should be adjusted, adjusting the first frequency chirp.

27. The computer-readable medium of claim 25 wherein the first characteristic is associated with a first bit-error-ratio related to the first optical signal.

* * * * *